United States Patent [19]

Foresman et al.

[11] Patent Number: 4,740,128

[45] Date of Patent: Apr. 26, 1988

[54] APPARATUS FOR DISCHARGING A REACTION VESSEL

[75] Inventors: James D. Foresman, Hughesville, Pa.; Heinrich F. Muenster, Vienna, Austria

[73] Assignee: Sprout-Bauer, Inc., Muncy, Pa.

[21] Appl. No.: 77,948

[22] Filed: Jul. 24, 1987

Related U.S. Application Data

[63] Continuation of Ser. No. 810,731, Dec. 19, 1985, abandoned.

[51] Int. Cl.$^4$ ............................................. B65G 65/48
[52] U.S. Cl. .................................... 414/306; 414/325; 414/326; 414/211; 222/254; 222/238; 222/413
[58] Field of Search ............... 414/304, 305, 306, 307, 414/308, 309, 310, 311, 312, 323, 324, 325, 326, 327, 133, 150, 152, 153, 213, 209, 211; 222/254, 271, 413, 410, 236, 238

[56] References Cited

U.S. PATENT DOCUMENTS

| | | | |
|---|---|---|---|
| 2,297,289 | 9/1942 | Collis et al. | 414/213 |
| 2,904,228 | 9/1959 | Topping | 222/410 |
| 3,193,117 | 7/1965 | Best | 414/306 |
| 3,927,774 | 12/1975 | Teske et al. | 414/325 X |
| 3,935,952 | 2/1976 | Banner | 414/325 |
| 3,942,771 | 3/1976 | Knutsen | 222/410 X |
| 4,083,462 | 4/1978 | Teske et al. | 222/410 X |

FOREIGN PATENT DOCUMENTS

0000473 1/1979 Japan ..................... 414/304

Primary Examiner—Frank E. Werner
Attorney, Agent, or Firm—William W. Habelt

[57] ABSTRACT

A discharging apparatus for a large diameter, generally vertically walled reaction vessel in which a recessed dish or receiving structure having the same diameter as the reaction vessel is mounted beneath the lower discharge end of the reaction vessel. There is an aperture in the floor of this receiving structure and a rotating impeller urges material received from the reaction vessel through this aperture into a smaller diameter recessed receiving structure which is also equipped with a rotating impeller to remove material to a screw conveyor for removal from the system. This screw conveyor can be significantly smaller than would be required using a conventional screw conveyor reaction vessel discharge.

4 Claims, 3 Drawing Sheets

APPARATUS FOR DISCHARGING A REACTION VESSEL

This is a continuation of application Ser. No. 810,731, now abandoned, filed on Dec. 19, 1985.

BACKGROUND OF THE INVENTION

1. Field of the Invention

The present invention relates to bulk material handling equipment and in particular to apparatuses for discharging material from reaction vessels.

2. Brief Description of the Prior Art

It has been suggested that for certain processes, such as long retention time sulfite wood chip treating, the use of a vertically walled reaction vessel would have advantages over the use of an inverted conical vessel. In view of overhead space limitations, it might also be necessary to carry out such processes in a vertically walled reaction vessel having a relatively large diameter of perhaps 8 feet instead of in a tall, narrow vessel of equivalent capacity.

Reaction vessels are often conventionally discharged by means of screw conveyors, and it is well known that in such an arrangement screw diameter is desirably proportioned to reaction vessel diameter. Thus, one disadvantage to using a large diameter, vertically walled reaction vessel heretofore has been that the wide vessel would require a considerably larger and more expensive conveyor screw to empty it as compared to a tall, narrow vessel of equivalent capacity. For example, an 8 foot diameter vertically walled reaction vessel might conventionally require a screw conveyor discharger which is 42 inches in diameter.

SUMMARY OF THE INVENTION

It is therefore the object of the present invention to provide a means for emptying a large diameter, vertically walled reaction vessel which does not require the large, expensive screw conveyor heretofore used for that purpose. In the reaction vessel discharging apparatus of the present invention, a recessed receiving structure having the same diameter as the reaction vessel is positioned beneath the lower discharge end of the reaction vessel to receive material from the vessel. There is an aperture in the floor of this structure and a horizontal agitator impeller positioned inside the receiving structure rotates about the vertical center line of the recessed receiving structure to remove material through the aperture to a second, smaller recessed receiving structure positioned beneath the aperture. This second receiving structure is also equipped with an agitator impeller which urges the material toward a screw conveyor for removal from the system. This screw conveyor is considerably smaller than the screw conveyor which would be required to empty the reaction vessel absent the intermediate receiving structures.

BRIEF DESCRIPTION OF THE DRAWINGS

The apparatus of the present invention is further described with difference to the accompanying drawings in which.

DETAILED DESCRIPTION

Figure 1:
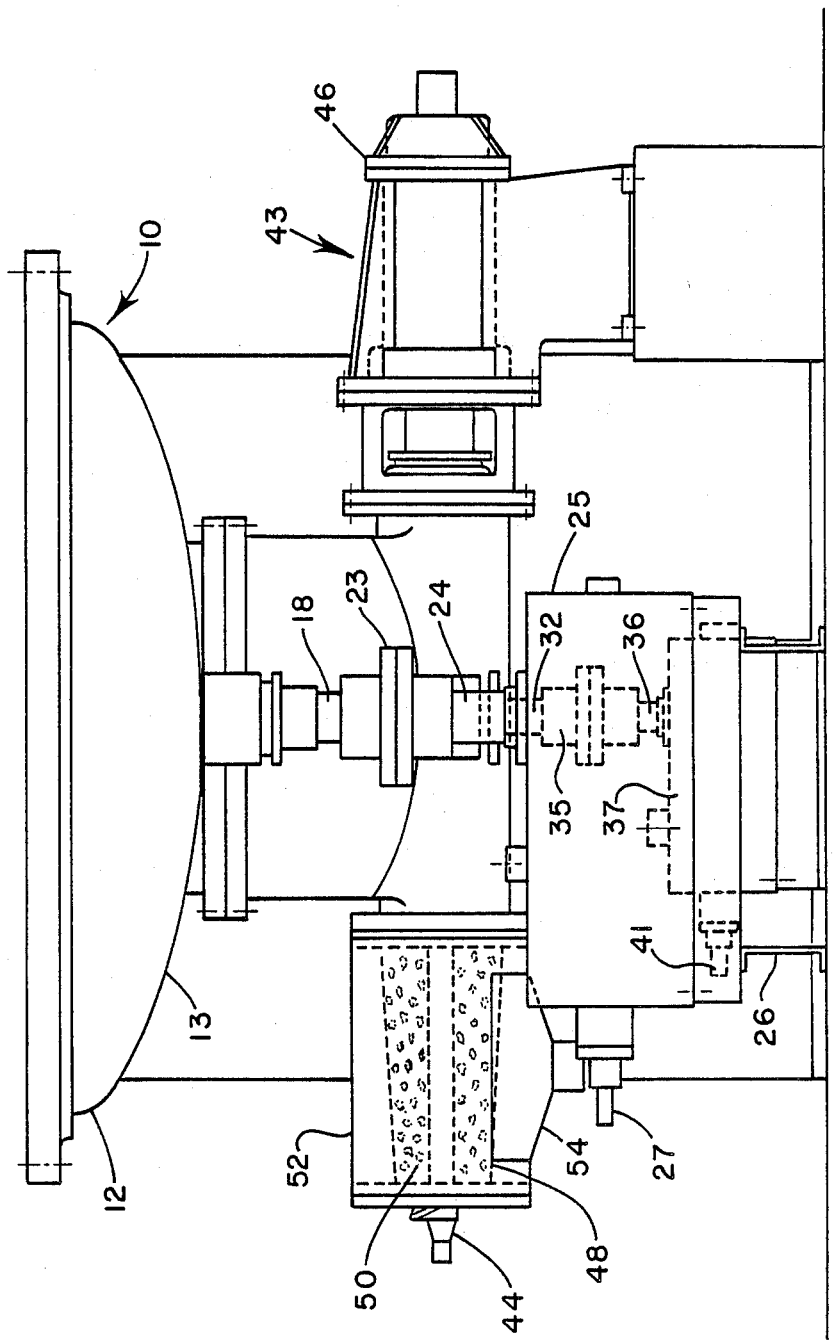
FIG. 1 is a side elevational view of a preferred embodiment of the reaction vessel discharging apparatus of the present invention.
Figure 2:
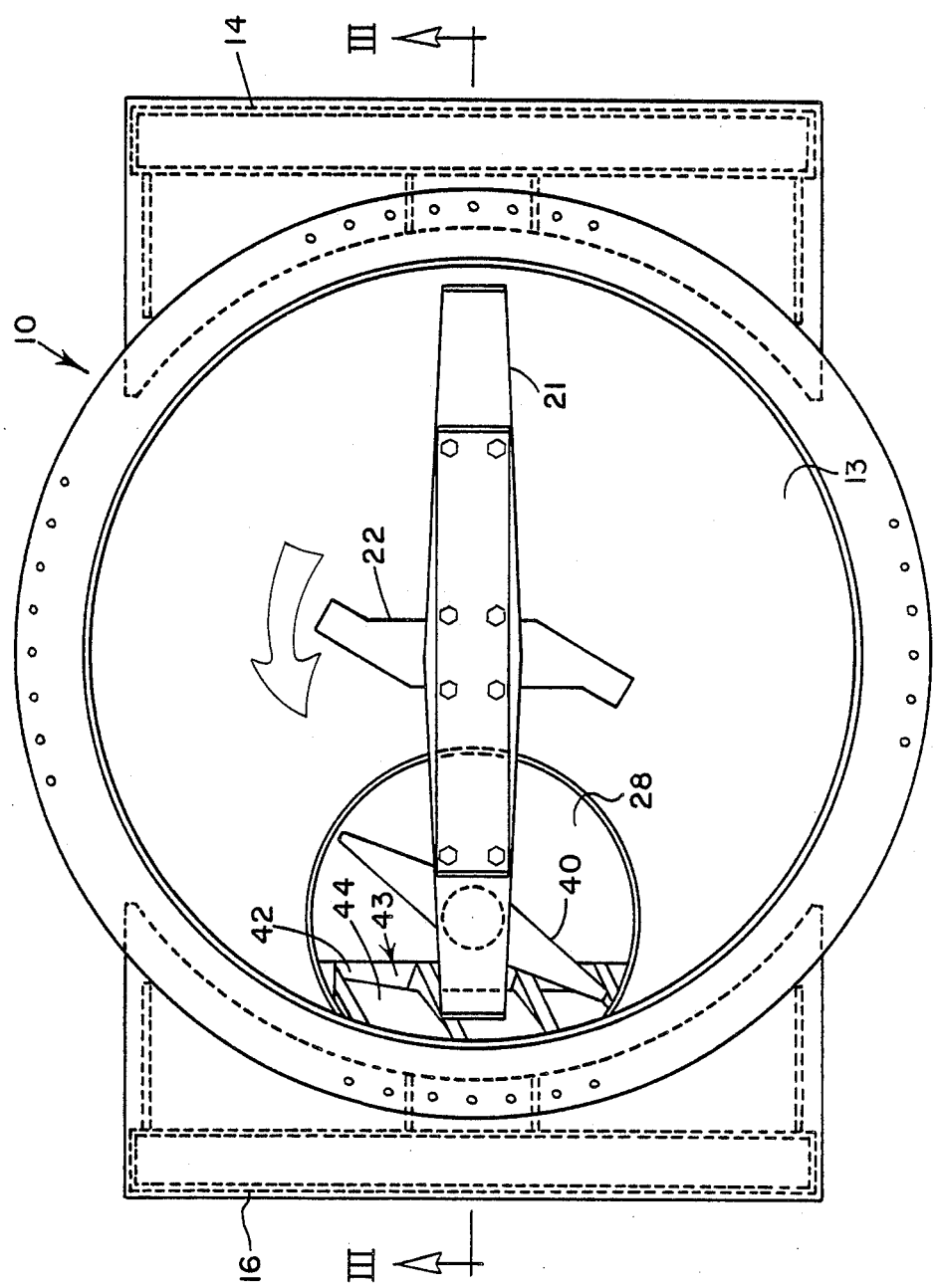
FIG. 2 is a plan view of the apparatus shown in FIG. 1 (FIG. 1 is a view from the left side of FIG. 2)
Figure 3:
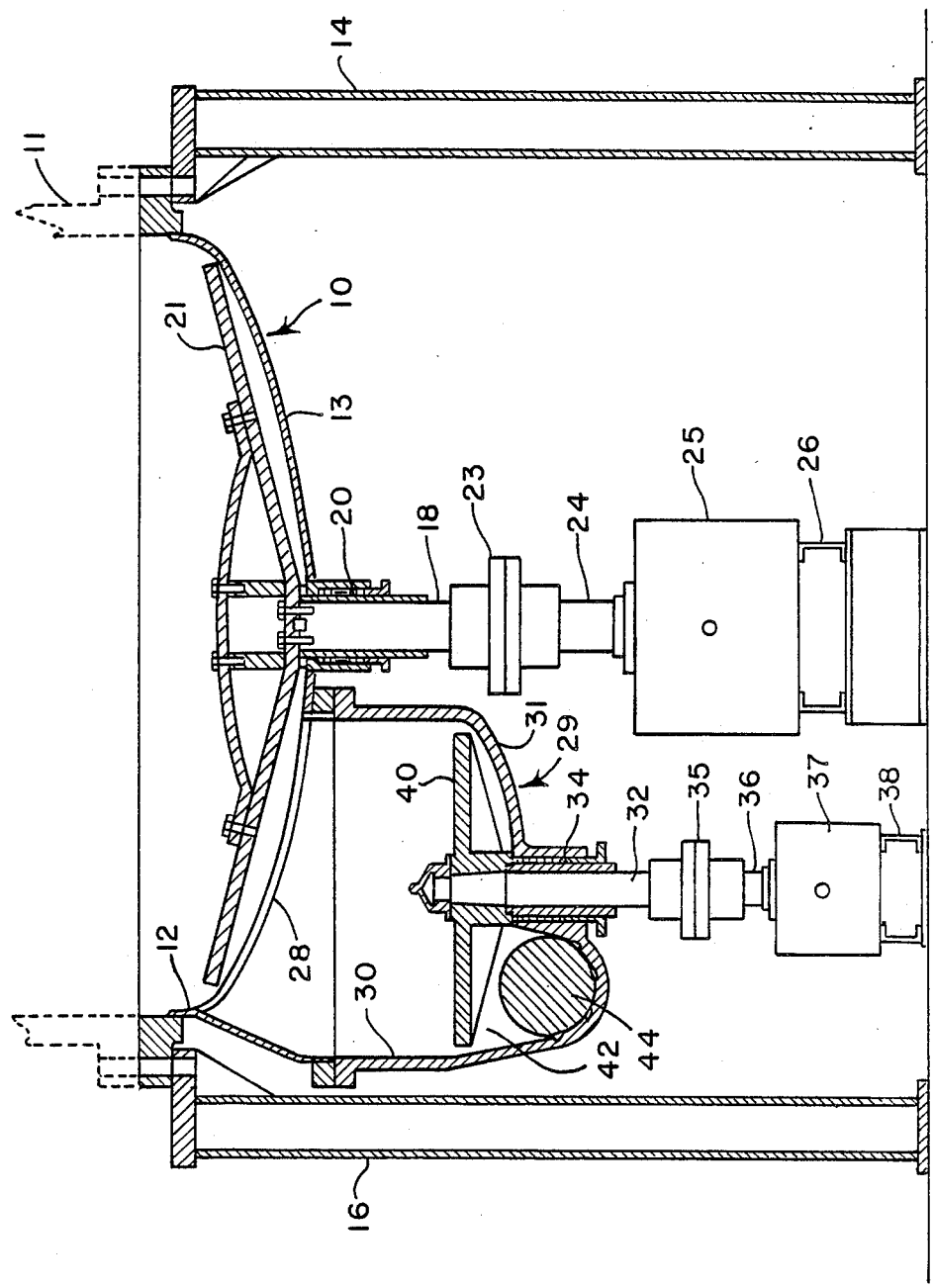
FIG. 3 is a front view with a partial vertical cross section of the apparatus, the cross section being taken through line III—III in FIG. 2.

Referring to the drawings, the apparatus of the present invention includes a large diameter recessed receiving dish or structure shown generally at numeral 10. This receiving structure is fixed to the lower discharge end of a wide, vertically walled pressurized reaction vessel (shown in fragment at and in phantom lines only in FIG. 3 at numeral 11). This vessel may also be unpressurized. It will also be appreciated that the discharging apparatus of the present invention may also be advantageously used with a reaction vessel which has upwardly diverging side walls. The receiving structure is recessed and it has a vertical side wall 12 and a recessed floor 13 sloping inwardly from the side wall 12 to the vertical center line of the receiving structure 10 as best seen in FIG. 3. This receiving structure as well as the entire assembly are supported by supports 14 and 16. On the vertical center line of the receiving structure there is a shaft 18 sealed by packing gland 20. Fixed to the upper terminal end of this shaft there are horizontal agitator impellers 21 and 22. Shaft 18 is connected by shaft coupling 23 to another shaft 24 which is connected to reduction gearing 25 which is mounted on base 26. Shaft 27 projects from reduction gearing 25 and is connected to an electric motor (not shown) which drives shafts 18 and 24 so that impellers 21 and 22 sweep the floor 13 of receiving structure 10.

In the floor 13 of receiving structure 10 there is an aperture 28. Material collected in the receiving structure is urged through this aperture by the impeller 22 into a second smaller diameter, recessed receiving structure shown generally at numeral 29 which has a generally vertical wall 30 and a recessed floor 31 sloping inwardly from the side wall 30 to the center line of the receiving structure 29 as best seen in FIG. 3. Those skilled in the art will appreciate that the diameter of aperture 28 will be sufficiently large so that there will be no bridging of the material passing through aperture 28. This smaller receiving structure is fixed at its upper end to the larger receiving structure 10, and at its vertical center line there is a shaft 32 sealed by packing gland 34. Shaft 32 is connected by shaft coupling 35 to shaft 36 which is connected to reduction gearing 37 which is mounted on base 38. Shaft 36 is fixed at its upper terminal end to another horizontal agitator impeller 40. Shaft 41 projects from reduction gearing 37 and is connected to an electric motor (not shown) which drives shafts 32 and 36 so that impeller 40 sweeps the floor of receiving structure through aperture 42 in its floor to screw conveyor shown generally at numeral 43 for removal from the system. Included in said screw conveyor is a screw 44, a screw bearing assembly 46, a tapered housing 48 having a plurality of apertures as at 50, an effluent jacket 52 for collecting liquid squeezed from material conveyed in the screw and a drain 54 for the effluent jacket.

In the above described assembly, if the vessel 11 is 8 feet in diameter, the large diameter recessed receiving structure 10 will be of the same diameter while receiving structure 29 will be 42 inches and the screw conveyor 42 will be 12 inches in diameter. It will thus be appreciated that a significantly smaller, and less expensive screw conveyor can now be used to discharge a wide, vertically wall reaction vessel with the apparatus of the present invention that was heretofore possible. Although the invention has been described with a certain degree of particularity, it is to be understood that the present disclosure has been made only as an example and that the scope of the invention is defined by what is hereafter claimed.

What is claimed is:

1. An apparatus for receiving material from the lower discharge end of a reaction vessel comprising:
    (a) a larger diameter recessed receiving structure having a side wall and a vertical center line and a floor sloping inwardly from the side wall to the center line, and having an aperture in the floor radially displaced from the vertical center line;
    (b) a horizontal impeller means positioned in said larger diameter recessed receiving structure and being rotatable about the vertical center line of said larger diameter recessed receiving structure to remove material in said larger diameter recessed receiving structure therefrom through the aperture in the floor of said larger diameter recessed receiving structure;
    (c) a smaller diameter recessed receiving structure having a vertical center line and a side wall and a floor sloping inwardly from the side wall to the center line, and having an aperture in the floor radially displaced from the center line, said smaller diameter recessed receiving structure being positioned beneath said aperture in the floor of the larger diameter recessed receiving structure to receive material removed from said larger diameter recessed receiving structure;
    (d) screw conveyor means for transporting material discharged from said smaller diameter recessed receiving structure, said screw conveyor means positioned beneath said aperture in the floor of the smaller diameter receiving structure to receive material discharged from said smaller diameter recessed receiving structure;
    (e) a second horizontal impeller means positioned in said smaller diameter recessed receiving structure and being rotatable about the center line of said smaller diameter recessed receiving structure to discharge material in said smaller diameter recessed receiving structure therefrom through the aperture in the floor of said smaller diameter receiving structure and into the screw conveyor means;
    (f) first drive means operatively associated with said larger diameter recessed receiving structure for rotating the horizontal impeller means positioned in said larger diameter recessed receiving structure; and
    (g) second drive means operatively associated with said smaller diameter recessed receiving structure for rotating the second horizontal impeller means positioned in said smaller diameter recessed receiving structure.

2. The apparatus defined in claim 1 wherein the reaction vessel and the larger diameter recessed receiving structure have approximately equal diameters.

3. The apparatus defined in claim 1 wherein the larger diameter recessed receiving structure is positioned beneath the lower discharge end of a pressurized reaction vessel.

4. The apparatus defined in claim 1 wherein the larger diameter recessed receiving structure is positioned beneath a lower discharge end of an unpressurized reaction vessel.

* * * * *